May 22, 1923.   1,455,775

G. C. BERRYMAN

LEAKPROOF INNER TUBE

Filed Feb. 12, 1921

Inventor
Grover C. Berryman

Attorney

Patented May 22, 1923.

1,455,775

UNITED STATES PATENT OFFICE.

GROVER C. BERRYMAN, OF LOS ANGELES, CALIFORNIA.

LEAKPROOF INNER TUBE.

Application filed February 12, 1921. Serial No. 444,390.

*To all whom it may concern:*

Be it known that I, GROVER C. BERRYMAN, a citizen of the United States, residing at Los Angeles, in the county of Los Angeles and State of California, have invented new and useful Improvements in Leakproof Inner Tubes, of which the following is a specification.

This invention relates to inner tubes for pneumatic tires, and particularly pertains to leak-proof inner tubes.

An object of the invention is to provide a construction for inner tubes adapted to render them leak-proof.

Another object is to provide a construction in inner tubes whereby a layer of uncured rubber or other suitable material, molded with an arciform surface, is held forcibly against the inner surface of the tube by the air pressure in such a manner that it is subject to a continual compression force which tends to close any punctures occurring therein.

Another object is to provide a leak-proof inner tube of simple construction and adapted to economic manufacture.

A further object is to provide a means of forming a leak-proof element in an inner tube in a simple and economic manner.

Other objects will appear hereinafter.

The invention is illustrated in the accompanying drawings, in which.

Figure 1:
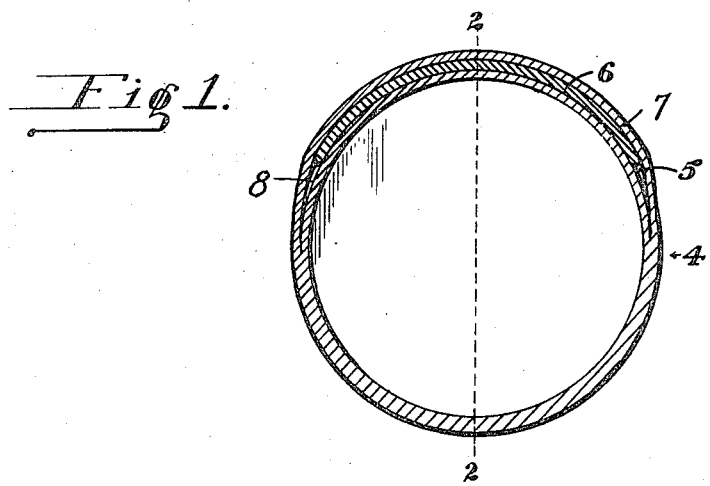
Figure 1 is a sectional view of a segment of an inner tube embodying the features of this invention.
Figure 2:
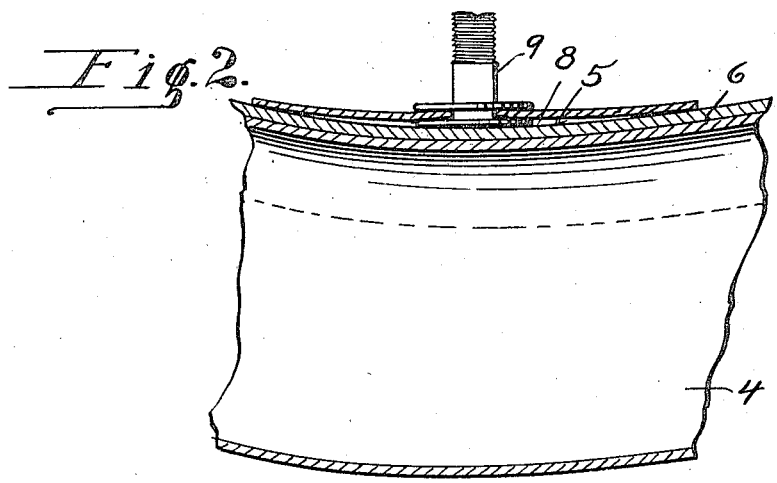
Figure 2 is a side elevation showing portions of the layers removed.
Figure 3:
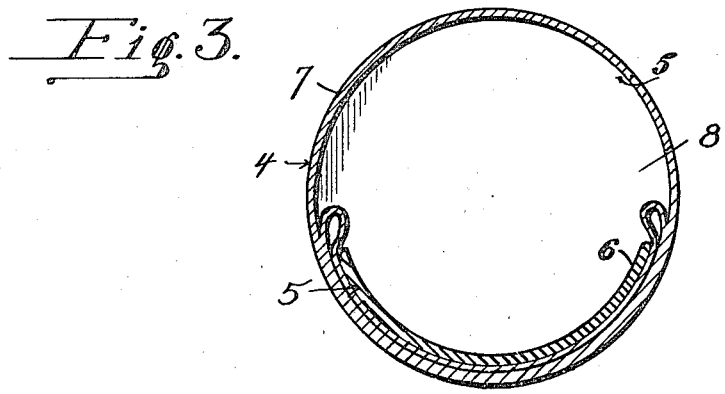
Figure 3 is a section taken in the same plane as Figure 1 showing the position of the layers when the tube is inflated.

The inner tube 4 is built up to form the inner layer 5. The puncture-resisting strip 6 of uncured rubber or other suitable material is bonded to the inner periphery of the layer 5 and reaches entirely around circumferentially and substantially one-third around in cross-section. The outer faces of the layer 5 and strip 6 are made non-adhesive from a transverse center line inwardly. Then the outer layer 7 is built up, and bonded to the outer half and not bonded to the inner half of the inner layer 5 and not bonded to the strip 6, thus leaving a compressed air space 8 between the inner halves of the layers 5 and 7 and the strip 6 is in the compressed air space 8 and the tire valve 9 communicates with the compressed air space 8. The puncture-resisting strip 6 is curved to conform to the inner part of the tube. The parts normally occupy the positions shown in Figs. 1 and 2, with the strip 6 against the inner side of the tube. When the tube is inflated the chamber 8 enlarges and the inner layer 5 and strip 6 are pressed outwardly and become a part of the tread of the tube, with their curvatures reversed. This thickens the tread and places the material under compression, so that when the tube is punctured the compression will close the puncture. This result is facilitated by using uncured rubber for the strip 6.

I claim:

1. An inner tube built up of two layers, said layers being molded together outwardly from a transverse center line and said layers being molded separately inwardly from the transverse center line so as to form a compressed air space between the layers entirely around the tube, circumferentially and half way around crosswise, a puncture-resisting strip of uncured rubber secured to the outer face of the inner layer in the compressed air space all the way around, and a tire valve communicating with the compressed air space.

2. An inner tube comprising an annular hollow layer, a puncture-resisting strip secured to the inner periphery of the layer, a second layer encompassing the first layer and strip and forming an air chamber between the inner halves of the layers, the strip being in the air chamber, and a tire valve communicating with the air chamber.

GROVER C. BERRYMAN.